United States Patent [19]

Elmore

[11] Patent Number: 5,096,543

[45] Date of Patent: Mar. 17, 1992

[54] CARRIER GAS APPARATUS FOR EVAPORATION AND CONDENSATION

[75] Inventor: Carl L. Elmore, Glens Falls, N.Y.

[73] Assignee: Kamyr, Inc., Glens Falls, N.Y.

[21] Appl. No.: 588,770

[22] Filed: Sep. 27, 1990

[51] Int. Cl.$^5$ .................... B01D 3/02; C02F 1/04
[52] U.S. Cl. .................... 202/172; 202/177; 202/185.1; 202/185.2; 202/189; 202/197; 202/236; 202/267.1; 165/167; 203/10; 203/22; 203/49; 203/90; 203/DIG. 8; 203/DIG. 9; 203/DIG. 20
[58] Field of Search ............ 202/234, 236, 197, 185.1, 202/185.2, 177, 180, 189, 267.1, 172, 173; 203/49, DIG. 20, DIG. 8, 90, 10, 11, 22, 40, 86, DIG. 9; 165/110, 166, 167; 159/18

[56] References Cited

U.S. PATENT DOCUMENTS

| | | | |
|---|---|---|---|
| 2,027,395 | 1/1936 | McVoy | 202/53 |
| 3,203,875 | 8/1965 | Sturtevant | 202/173 |
| 3,211,219 | 10/1965 | Rosenblad | 261/112.1 |
| 3,243,359 | 3/1966 | Schmidt | 202/174 |
| 3,248,306 | 4/1966 | Cummings | 159/4.01 |
| 3,303,098 | 2/1967 | Lagowski | 176/65 |
| 3,317,406 | 5/1967 | Beard | 203/49 |
| 3,326,779 | 6/1967 | Rodgers | 203/49 |
| 3,345,272 | 10/1967 | Collins | 203/49 |
| 3,352,107 | 11/1967 | Blaskowski | 60/64 |
| 3,451,220 | 6/1969 | Buscemi | 60/73 |
| 3,476,653 | 11/1969 | Doland | 202/173 |
| 3,596,328 | 8/1971 | Michels | 202/173 |
| 3,649,469 | 3/1972 | MacBeth | 203/10 |
| 3,833,479 | 9/1974 | Fredriksson | 203/49 |
| 4,094,747 | 6/1978 | Pfenninger | 202/173 |
| 4,102,752 | 7/1978 | Rugh | 202/180 |
| 4,227,373 | 10/1980 | Amend et al. | 60/618 |
| 4,243,526 | 1/1981 | Ransmark | 203/49 |
| 4,302,297 | 11/1981 | Humiston | 202/185 |
| 4,391,102 | 7/1983 | Studhalter et al. | 60/649 |
| 4,553,396 | 11/1985 | Heizer | 159/4.01 |
| 4,678,028 | 7/1987 | Conant et al. | 165/72 |

FOREIGN PATENT DOCUMENTS

| | | | |
|---|---|---|---|
| 964504 | 12/1956 | Fed. Rep. of Germany | 203/DIG. 4 |
| 1902956 | 8/1970 | Fed. Rep. of Germany | 203/49 |
| 780272 | 7/1957 | United Kingdom | 203/49 |
| 894936 | 4/1962 | United Kingdom | 203/10 |

*Primary Examiner*—Wilbur Bascomb, Jr.
*Attorney, Agent, or Firm*—Nixon & Vanderhye

[57] ABSTRACT

The waste heat from a steam turbine is condensed and used to desalinate sea water at the same time. The waste steam from a turbine is fed to a condenser through which cold sea water passes. As the cold sea water condenses the waste steam, it is warmed. It is then introduced into a first chamber which includes a number of spray heads disposed over fill (packing) that acts as an evaporator. Any water not evaporated is collected in a sump at the bottom of the first chamber, and the evaporated vapor is passed upwardly under the influence of a fan and ultimately to a second chamber. The second chamber may either be stacked above the first chamber, or in side-by-side relationship with it. A condenser, such as a number of dimpled metal plates, or plastic membranes defining a closed loop, or another set of spray heads and fill, are provided in the second chamber. Air typically recirculates from the bottom of the second chamber back into the first chamber. The product (fresh) water is collected at the bottom of the second chamber, and may be cooled by cold sea water and a portion of it introduced as the condensing liquid in the second chamber.

12 Claims, 3 Drawing Sheets

CARRIER GAS APPARATUS FOR EVAPORATION AND CONDENSATION

BACKGROUND AND SUMMARY OF THE INVENTION

There are many installations—such as power plants—in which the waste heat from a steam turbine is cooled in a cooling tower, or like condenser, utilizing sea water. The sea water is typically then merely discharged back into the body of salt water from which it was withdrawn, providing a source of thermal pollution. Especially in shallow bays, this may be a significant pollution problem, and in any event it is a waste of the energy from the steam turbine.

According to the present invention, the waste steam from a steam turbine or the like is productively utilized to desalinate water—preferably sea water that is used to cool the waste steam. In this way, the amount of thermal pollution is greatly reduced, and at the same time a useful end product—fresh water—is produced.

According to the method of the present invention, fresh water is recovered from water having a substantial salt content (such as sea water) while simultaneously condensing waste steam, by practicing the following steps: a) Passing water having a substantial salt content into heat exchange relationship with waste steam, so as to condense the steam and the water having a substantial salt content; b) evaporating a portion of the heated water with substantial salt content from step (a); c) collecting the water from step (b) that does not evaporate; d) passing the evaporated water from step (b) into heat exchange relationship with a colder fluid so that the evaporated water condenses into fresh water; and e) collecting the fresh water that condenses in step (d).

Desalination apparatus according to the present invention typically comprises the following components: A generally upright vessel having first and second chambers. A first inlet for water to be desalinated into a central portion of the first chamber. Means for distributing water introduced into the first inlet into the first chamber so that evaporation thereof is facilitated. A mist separator adjacent the top of the first chamber. A sump adjacent the bottom of the first chamber for collecting water introduced into the first inlet that does not evaporate. Means defining a passageway for water vapor from any water that evaporates in the first chamber past the mist separator and into the second chamber. Gas moving means for supplying a force moving water vapor from the first chamber into the second chamber. Condensing means in the second chamber for condensing water vapor passing from the passageway into the second chamber into product water. And, a product water sump adjacent the bottom of the second chamber for collecting product water that condenses in the second chamber. The means for distributing water introduced into the first inlet into the first chamber so that evaporation is facilitated preferably comprises a plurality of spray nozzles disposed over fill (packing) within the first chamber. A similar type structure may be provided as the condensing means, although the condensing means may also comprise a plurality of dimpled plates defining a closed circulatory path within the second chamber, or plastic membranes defining such a closed circulatory path.

When spraying and fill means are utilized as the condensing means, product water from the product water sump is circulated into heat exchange relationship with sea water to produce cooler product water. A part of the cooler product water is recovered, while another part thereof is introduced into the spraying means in the second chamber. Heated sea water used to cool the product water may then be introduced as water to be evaporated in the first chamber.

The first and second chambers may be side by side, or the second chamber may be stacked on top of the first. Preferably, a fan—mounted in the passageway between the side by side chambers, or mounted above the second chamber when they are stacked, provides the gas moving means. In lieu of a fan a tall natural draft will be used to the move the gas.

According to another aspect of the present invention, a combination waste steam condensing and salt water desalinating system is provided. The system comprises: a turbine having a waste steam discharge conduit; a conduit conveying cool salt water; a heat exchanger operatively connected to the cool salt water conduit and the discharge conduit, and having a warmed salt water discharge line; an evaporator connected to the warmed salt water discharge line for evaporating a portion of the water therein to produce water vapor; a condenser for condensing the water vapor from the evaporator to produce product water; and collecting means for collecting the product water produced in the condenser.

It is a primary object of the present invention to provide a method and apparatus for minimizing thermal pollution as a result of cooling waste steam from a turbine or the like, while at the same time desalinating water. This and other objects of the invention will become clear from an inspection of the detailed description of the invention, and from the appended claims.

DETAILED DESCRIPTION OF THE DRAWINGS

Figure 1:
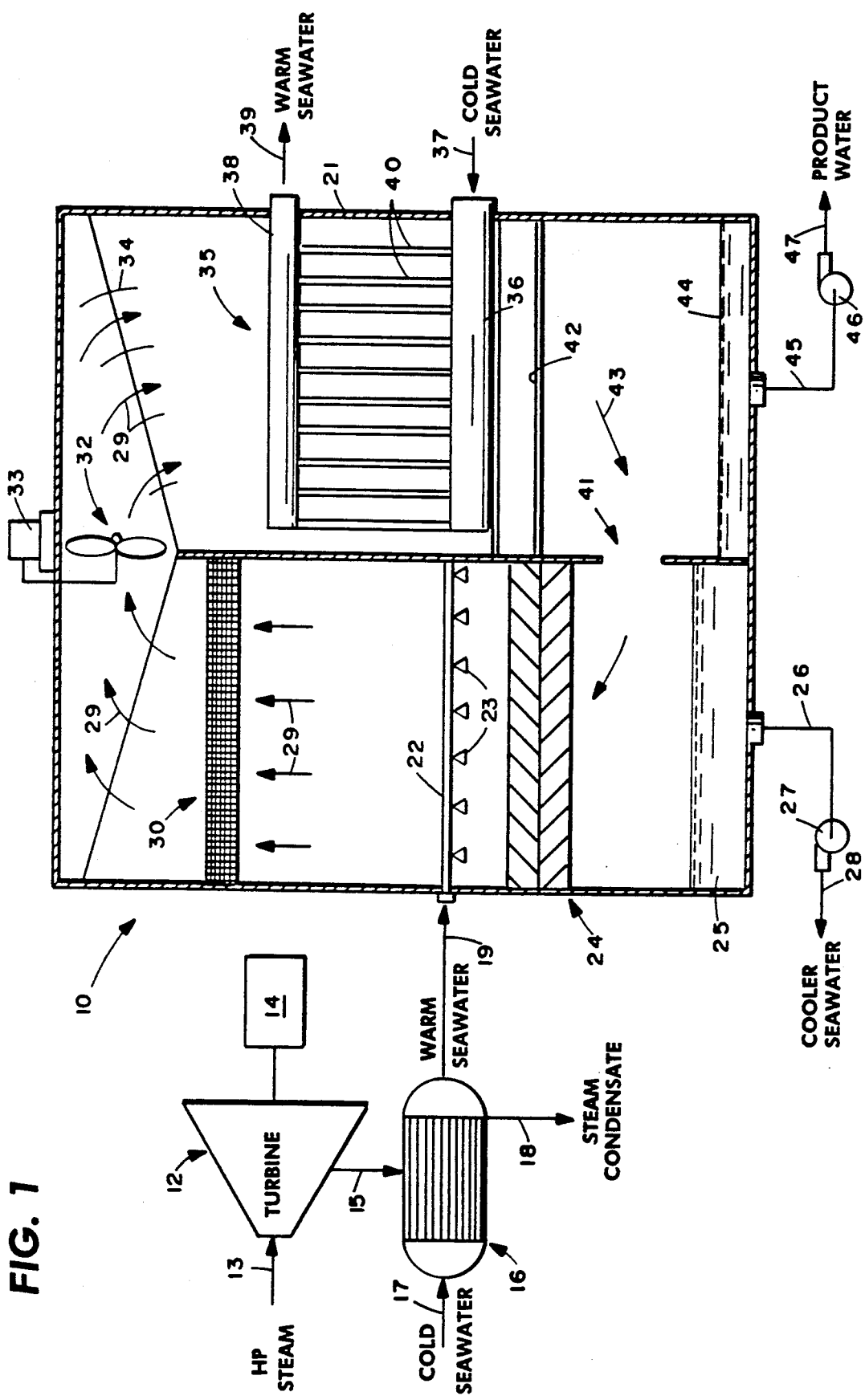
FIG. 1 is a side schematic view of an exemplary system according to the present invention.

The system of FIG. 1, illustrated generally by reference numeral 10, simultaneously cools the waste steam from a steam turbine 12 or the like, and desalinates water. The steam turbine 12, in a power generating or like facility, is fed with high pressure steam in line 13, and drives the generator 14. The waste steam is discharged at 15 and passes to a condenser 16, such as a cooling tower. To cool the waste steam, cold sea water, or like water containing a substantial concentration of salt, is fed in at line 17, the steam condensate being withdrawn at 18 (and reheated to make further high pressure steam), while the warmed sea water is discharged in line 19. In most conventional applications, the warm sea water in line 19 is merely fed back to the source of sea water—e.g. bay, ocean, or the like—providing a significant source of thermal pollution.

According to the present invention, the apparatus 10 preferably comprises a generally upright vessel having a first chamber 20 and a second chamber 21. In the FIG. 1 embodiment, the chambers are disposed side by side. Mounted in the first chamber 20 and connected to the conduit 19—which is an inlet into the central portion of the first chamber 20—is a means for distributing water into the first chamber so that evaporation thereof is facilitated—that is an evaporator. The evaporator preferably comprises a generally horizontally extending pipe 22 having nozzles or spray heads 23 extending downwardly therefrom, and disposed immediately above a fill means 24. Fill means 24 preferably comprises a conventional fill or packing for a cooling tower, such as a multichambered, large surface area, plastic body or collection of bodies which provide a large surface area and allow passage of both liquid and gas therethrough. The warmed sea water is sprayed onto the fill 24 by the nozzles or spray heads 23, and a portion of the water is evaporated while any of the sea water not evaporated is collected in a sump 25 adjacent the bottom of the chamber 20. A conduit 26 leading from the sump 25 transports the sea water to pump 27, and it is ultimately pumped by pump 27 into conduit 28. The now lower temperature sea water in conduit 28 may then be passed back to the ocean, bay, or the like, containing much less thermal pollution than the water in line 19 or could be circulated to turbine condenser for cooling.

The water vapor that has evaporated in the first chamber 20 passes upwardly therein as indicated by arrows 29. It passes through a mist separator 30 into a passage 31 between the chambers 20, 21. Mounted in the passageway 31 is a gas moving means for supplying a force moving the water vapor from chamber 20 to chamber 21. The gas moving means preferably comprises a fan 32 powered by a motor 3. The vapor 29 passes past vapor foils 34 in the top of the second chamber 21, and then comes in contact with condensing means (condenser 35) in the second chamber, the condenser 35 condensing the water vapor passing from the passageway 31 into the chamber 21 to produce product (fresh) water.

In the FIG. 1 embodiment, the condensing means comprises a bottom header 36 into which cool (ambient temperature) sea water is introduced in line 37, as well as a top header 38 with a discharge line 39 for warmed sea water. A closed loop passageway is established between the headers 36, 38 by the dimpled plate heat exchangers 40. Between each pair of dimpled plates 40 the water is allowed to flow, the water moving upwardly due to the thermosiphonic effect. The dimpled plates 40 may be constructed such as disclosed in U.S. Pat. Nos. 3,211,219 and 3,512,239, the disclosures of which are incorporated by reference herein. Alternatively, a closed loop path for the condensing sea water could be provided between plastic membranes, even in the form of a plastic "bag" connected up between the lines 37, 39.

Water vapor 29 passing downwardly in second chamber 21 condenses on the exterior surfaces of the dimpled plates 40, and ultimately flows down into the product water sump 44. Preferably, the condenser 45 is supported by a plurality of spaced horizontally extending support beams 42, and the gas remaining after passing between the plates 40—as indicated at 43—flows through the opening 41 in the dividing wall between the chambers 20, 21.

The fresh/product water in sump 44 is drawn into the conduit 45 by the pump 46, and discharged in line 47. The product water in line 47 may then be used for any purpose to which fresh water would normally be put.

Figure 2:
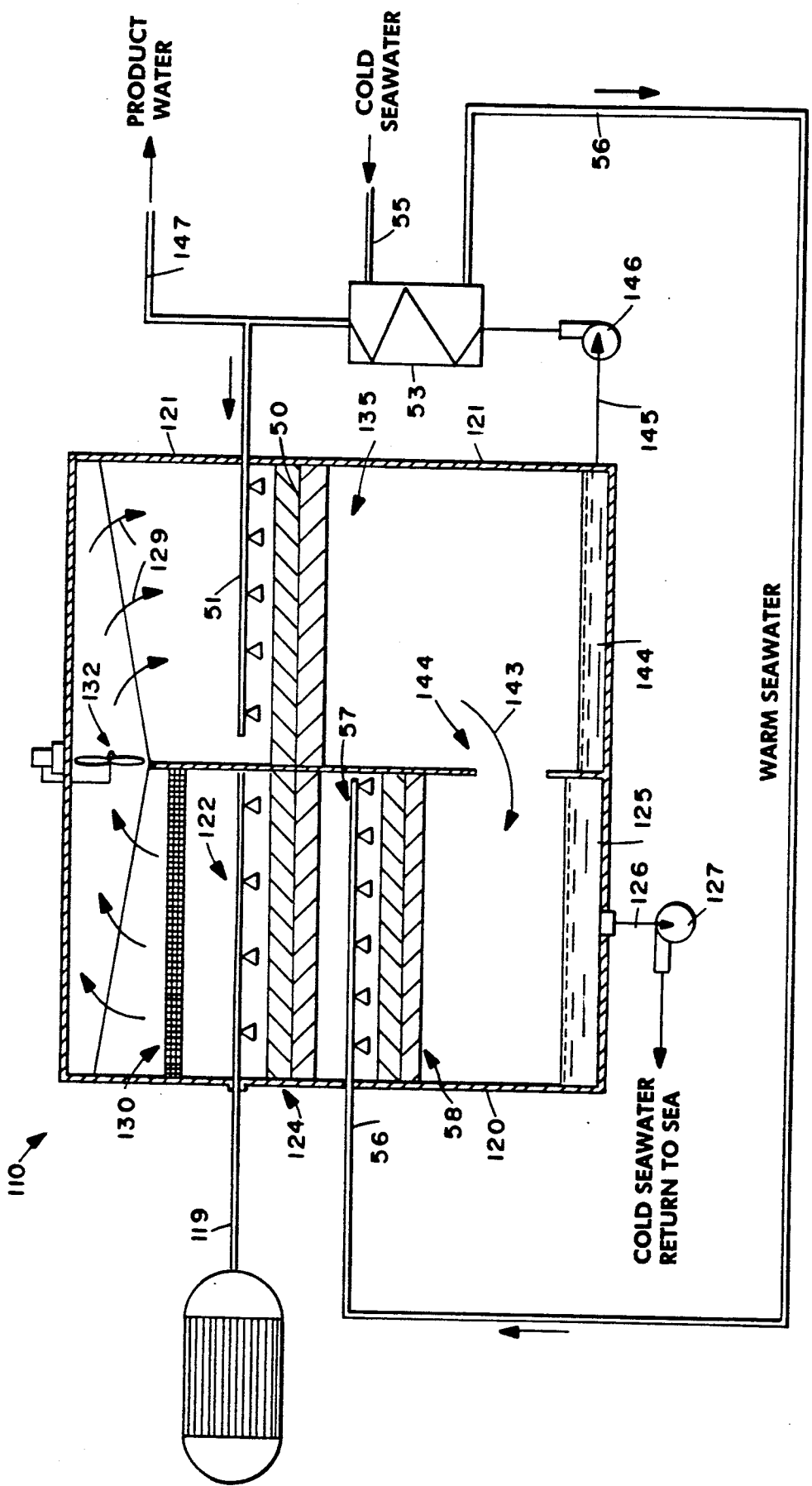
FIG. 2 is a side schematic view of another embodiment of an exemplary system according to the invention.

In the FIG. 2 embodiment, structures comparable to those in the FIG. 1 embodiment are shown by the same reference numeral only preceded by a "1".

In the FIG. 2 embodiment, the condensing means 135 comprises fill means 50—like the fill means 125—and spraying means 51 for spraying relatively cool water onto the fill means 50. The water vapor 29 condenses as it flows downwardly through the fill means 50, collecting in sump 144, while remaining gas passes—as indicated by arrow 143—in the opening 141 between the side by side chambers 120, 121.

Another distinction between the apparatus 110 of the FIG. 2 embodiment and the FIG. 1 embodiment is exactly what is done to the product water in line 147. In the line 147, the product water passes through heat exchanger 53, being cooled by cold (ambient temperature) sea water introduced in line 55, and discharged from the heat exchanger into line 56. A portion of the water in the line 147 after the heat exchanger 53 is fed to the spray heads 51, while another portion is the fresh product water that is used for whatever purpose it is desired to put the fresh water to. The warmed sea water in line 56 from heat exchanger 53 is then introduced into the spray heads 57 in the first chamber 120, above the fill means 58, the structures 57, 58 comprising a second evaporator in the first chamber 120.

Figure 3:
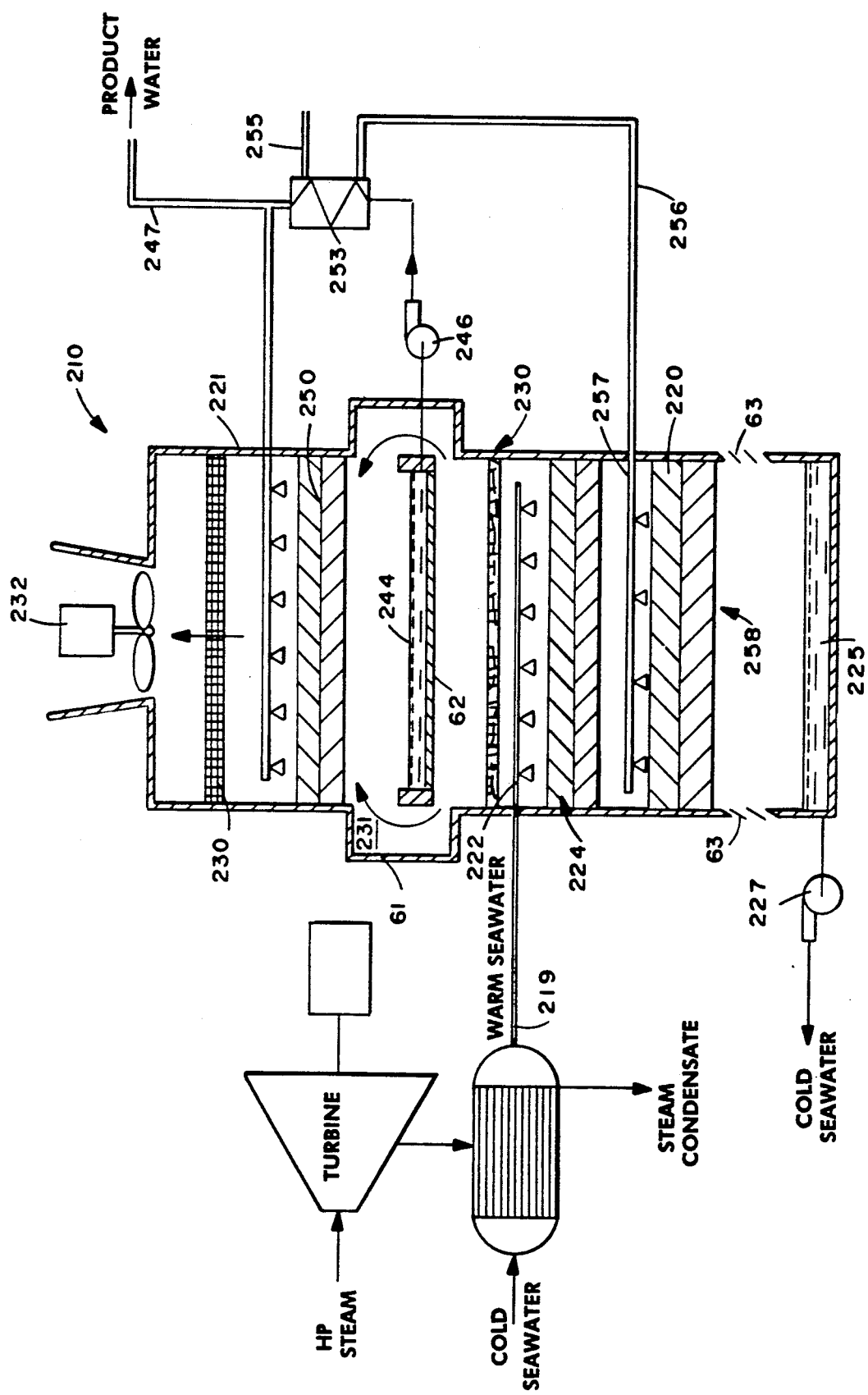
FIG. 3 is a side view of a third exemplary system according to the invention.

In the FIG. 3 embodiment, structures comparable to those in the FIGS. 1 and 2 embodiment are shown by the same two digit reference numeral, only preceded by a "2".

Perhaps the major distinction between the apparatus 210 in the FIG. 3 embodiment and the apparatus 110 in the FIG. 2 embodiment is the fact that the first and second chambers 220, 221 are stacked one on top of the other rather than side by side. This is accomplished by providing the enlarged connection structure 61 which defines the passageway 231 between the first and second chambers 220, 221. The passageway 231 is around the pan 62, which defines the sump 244 into which the pump 246 is connected. The fan 232—instead of being mounted in the passageway between the chambers 220, 221, is mounted at the top of the second chamber 221, as illustrated in FIG. 3, so that air is continuously moved upwardly from the bottom chamber 220 up through, and exhausting from, the top of the second chamber 221. In order to provide the source of air for this flow—which, of course, entrains the water vapor therein—louvered openings 63 are preferably provided in the lower chamber 220, above the sump 225, and below the fill means (packing) 258.

While the chambers 20, 120, 220, 21, 121, 221, may be operated at ambient pressure, they can also be operated at a slight under pressure (that is less than one atmosphere). This would be accomplished in the FIG. 3 embodiment, for example, by restricting the inflow of air through the louvered openings 63.

With respect to FIG. 1, an exemplary operation in the practice of a method of recovering fresh water from water (e.g. sea water) having a substantial salt content, while simultaneously condensing waste steam, is provided. The steps of the method are: (a) Passing cold (ambient temperature) water having a substantial salt content, such as sea water in line 17, into heat exchange relationship (in condenser/cooling tower 6) with waste steam in line 15 (from steam turbine 12) so as to condense the steam and heat the sea water in line 19. (b) Evaporating a portion of the heated sea water in line 19, as by spraying it with spray heads 23 onto the fill 24. (c)

Collecting the water from step (b) that does not evaporate in sump 25, and ultimately discharging it by pump 27 back to the sea. (d) Passing the water vapor 29 from step (b), under the influence of fan 32, through a mist separator 30 and then into heat exchange relationship with colder fluid (e.g. ambient temperature sea water) in condenser 135, so that the evaporated water condenses on the plates 40 into fresh water which flows in a thin film down a face of the dimpled plates 40, and (e) Collecting the fresh water flowing down the plates 40 in the sump 44.

The condensing step may be practiced by either passing ambient sea water in a closed loop including headers 36, 38 and dimpled plates 40, or by spraying a portion of the product water from sump 144, which was cooled in heat exchanger 53, by spray heads 51 onto fill 50 (FIG. 2). The air passing past the heat exchangers 35, 135 returns to the first chamber through openings 41, 141, or in the FIG. 3 embodiment is expelled out of the top of the second chamber 220 while fresh air is drawn through louvered openings 63 in the bottom of the first chamber 220.

It will thus be seen that according to the present invention a method and apparatus have been provided for reducing the thermal pollution of sea water used for cooling waste steam, e.g. from a steam turbine, while at the same time using the heat energy in that sea water to effect evaporation. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. Desalination apparatus, comprising:
   a generally upright vessel having first and second chambers;
   a first inlet for water to be desalinated into said first chamber;
   first fill means mounted at a first vertical position in said first chamber, and first spray means mounted above said first fill means for spraying water to be desalinated onto said first fill means, said first spray means connected to said first inlet;
   a second inlet for water to be desalinated into said first chamber;
   second fill means mounted at a second vertical position in said first chamber, below said first vertical position, and second spray means mounted above said second fill means for spraying water to be desalinated onto said second fill means, said second spray means connected to said second inlet;
   a mist separator adjacent the top of said first chamber;
   a sump adjacent the bottom of said first chamber of collecting water introduced into said first and second inlets that does not evaporate;
   condensing means in said second chamber, comprising third fill means and third spray means for spraying relatively cool liquid into contact with said third fill means for condensing water vapor passing into contact with said condensing means into product water;
   a product water sump adjacent the bottom of said second chamber for collecting product water that condenses in said second chamber;
   a third inlet connected to said third spray means;
   a first pump and a first conduit interconnecting said product water sump with said third inlet;
   a heat exchanger in operative association with said first conduit;
   a second conduit for supplying cool water to be desalinated into said heat exchanger for cooling product water passing through said heat exchanger, and for withdrawing heated water to be desalinated from said heat exchanger;
   said second conduit connected to said second inlet; and
   a third conduit, branching off from said first conduit, for directing a portion of the product water away from said vessel, for use as desalinated water.

2. Apparatus as recited in claim 1 further comprising gas moving means for moving water vapor through said mist separator in said first chamber into contact with said condensing means in said second chamber.

3. Apparatus as recited in claim 2 wherein said first chamber is located side-by-side with said second chamber, said gas moving means located at the top of said first and second chambers, and wherein a gas flow passage is provided from above said product water pump into said first chamber.

4. Apparatus as recited in claim 3 further comprising means for heating water to be desalinated supplied to said first inlet, said heating means comprising a turbine having a waste steam discharge conduit, a cool salt water conduit, a second heat exchanger operatively connected to said discharge conduit and cool salt water conduit, and a warmed salt water conduit discharge line from said second heat exchanger, said warmed salt water discharge line connected to said first inlet.

5. Apparatus as recited in claim 2 wherein said second chamber is vertically above said first chamber, and wherein said vessel has a bulge at the interface between said first and second chambers, said product water sump disposed at said bulge and above said mist separator, and a gas passageway formed at said bulge around said product water sump.

6. Apparatus as recited in claim 5 wherein said gas moving means is located at the top of said second chamber, and further comprising air inlet means disposed in the sides of said first chamber, above said sump at the bottom of said first chamber.

7. Apparatus as recited in claim 6 further comprising a second mist separator disposed between said condensing means and said gas moving means.

8. Apparatus as recited in claim 1 wherein said second chamber is vertically above said first chamber, and wherein said vessel has a bulge at the interface between said first and second chambers, said product water sump disposed at said bulge and above said mist separator, and a gas passageway formed at said bulge around said product water sump.

9. Desalination apparatus, comprising:
   a generally upright vessel having first and second chambers, said second chamber vertically above said first chamber;
   a first inlet for water to be desalinated into said first chamber;
   first fill means mounted at a first vertical position in said first chamber, and first spray means mounted above said first fill means for spraying water to be desalinated onto said first fill means, said first spray means connected to said first inlet;

a mist separator adjacent the top of said first chamber, adjacent the interface between said first and second chambers;

a sump adjacent the bottom of said first chamber for collecting water introduced into said first inlet that does not evaporate;

condensing means in said second chamber for condensing water vapor passing into contact with said condensing means into product water;

a product water sump adjacent the bottom of said second chamber, adjacent the interface with said first chamber, for collecting product water that condenses in said second chamber;

a bulge in said vessel at said product water sump, defining a gas passage around said product water sump;

a gas moving means mounted at the top of second chamber, and a gas inlet means formed in said vessel in said firs chamber above said sump in said firs chamber, and below said fill means in said first chamber, gas being drawn by said gas moving means through said inlet, around said product water sump at said bulge, and to said gas moving means.

10. Apparatus as recited in claim 9 further comprising a second mist separator disposed above said condensing means, and below said gas moving means, in said second chamber.

11. Apparatus as recited in claim 9 wherein said gas moving means comprises a fan.

12. Apparatus as recited in claim 9 wherein said condensing means in said second chamber comprises fill means and means for spraying relatively cool liquid into said second chamber into contact with said fill means.

* * * * *